Sept. 9, 1969          G. L. CLARK ETAL                    3,465,418
                METHOD OF MAKING ONE-PIECE TUBULAR VEHICLE AXLE
Filed Sept. 3, 1965                                    12 Sheets-Sheet 1

INVENTOR
GLENN L. CLARK
WILLIAM G. HANLEY
JOHN PALOVCIK

BY 
ATTORNEYS

Sept. 9, 1969     G. L. CLARK ET AL     3,465,418

METHOD OF MAKING ONE-PIECE TUBULAR VEHICLE AXLE

Filed Sept. 3, 1965     12 Sheets-Sheet 2

INVENTORS
GLENN L. CLARK
WILLIAM G. HANLEY
JOHN PALOVCIK

BY Strauch, Nolan, Neale,
Nies and Bronaugh
ATTORNEYS

Sept. 9, 1969   G. L. CLARK ET AL   3,465,418
METHOD OF MAKING ONE-PIECE TUBULAR VEHICLE AXLE
Filed Sept. 3, 1965   12 Sheets-Sheet 3

INVENTORS
GLENN L. CLARK
WILLIAM G. HANLEY
JOHN PALOVCIK

Strauch, Nolan, Neale,
Nies and Bronaugh
ATTORNEYS

Sept. 9, 1969  G. L. CLARK ETAL  3,465,418
METHOD OF MAKING ONE-PIECE TUBULAR VEHICLE AXLE
Filed Sept. 3, 1965  12 Sheets-Sheet 6

INVENTORS
GLENN L. CLARK
WILLIAM G. HANLEY
JOHN PALOVCIK
BY Strauch, Nolan, Neale,
Nies & Bronaugh  ATTORNEYS Sept. 9, 1969        G. L. CLARK ET AL        3,465,418

METHOD OF MAKING ONE-PIECE TUBULAR VEHICLE AXLE

Filed Sept. 3, 1965        12 Sheets-Sheet 7

INVENTORS
GLENN L. CLARK
WILLIAM G. HANLEY
JOHN PALOVCIK

BY Strauch, Nolan, Neale,
Nies & Bronaugh    ATTORNEYS

Sept. 9, 1969  G. L. CLARK ETAL  3,465,418
METHOD OF MAKING ONE-PIECE TUBULAR VEHICLE AXLE
Filed Sept. 3, 1965  12 Sheets-Sheet 8

INVENTORS
GLENN L. CLARK
WILLIAM G. HANLEY
JOHN PALOVCIK
BY Strauch, Nolan, Neale,
Nies & Bronaugh  ATTORNEYS Sept. 9, 1969    G. L. CLARK ET AL    3,465,418
METHOD OF MAKING ONE-PIECE TUBULAR VEHICLE AXLE
Filed Sept. 3, 1965    12 Sheets-Sheet 9

INVENTOR
GLENN L. CLARK
WILLIAM G. HANLEY
JOHN PALOVCIK
BY
Strauch, Nolan, Neale
Nies and Bronaugh
ATTORNEYS Sept. 9, 1969   G. L. CLARK ETAL   3,465,418
METHOD OF MAKING ONE-PIECE TUBULAR VEHICLE AXLE
Filed Sept. 3, 1965   12 Sheets-Sheet 11

FIG. 28

INVENTOR
GLENN L. CLARK
WILLIAM G. HANLEY
JOHN PALOVCIK

BY Strauch, Nolan, Neale,
Nies and Bronaugh
ATTORNEYS

Sept. 9, 1969 G. L. CLARK ETAL 3,465,418
METHOD OF MAKING ONE-PIECE TUBULAR VEHICLE AXLE
Filed Sept. 3, 1965 12 Sheets-Sheet 12

INVENTOR
GLENN L. CLARK
WILLIAM G. HANLEY
JOHN PALOVCIK

BY Strauch, Nolan, Neale,
Nies and Bronaugh
ATTORNEYS

United States Patent Office 3,465,418
Patented Sept. 9, 1969

3,465,418
METHOD OF MAKING ONE-PIECE TUBULAR VEHICLE AXLE
Glenn L. Clark, Grosse Point Farm, Mich., and William G. Hanley and John Palovcik, Kenton, Ohio, assignors, by mesne assignments, to Rockwell-Standard Company, Pittsburgh, Pa., a corporation of Delaware
Filed Sept. 3, 1965, Ser. No. 484,856
Int. Cl. B23k 31/02; B60b 35/04
U.S. Cl. 29—477                    10 Claims

ABSTRACT OF THE DISCLOSURE

A one-piece trailer or like axle beam is made by two stage bending of a sheet of metal about a longitudinal axis and welding together the opposite edges to provide a tube while forming the tube with cylindrical end sections and a uniform size rectangular cross section central section and swaging the end sections to form thickened wall wheel bearing spindles and accurately cylindrical surfaces onto which brake spiders are fitted and welded.

---

The present invention refers to vehicle axles and more in particular to a one-piece tubular non-driving axle having integral wheel mounting spindles such as are used for trailers and the like, and the method of manufacture of such axles.

Tubular trailer axles of seamless or welded construction are known in the art. However, the fabrication of such axles prior to the present invention involved various time consuming work processes and difficult forging operations as for instance at the bearing seats of the wheel spindles.

The present invention provides a novel method for producing a tubular axle having integral swaged wheel mounting spindles which can be made in a minimum amount of time in large quantities assuring continuous overall identical products for a given axle size, and this is a major object of the invention.

Tubular axles have been provided which were made in one piece, that is, the outer ends of the tube are forged or upset to provide wheel spindle sections of reduced diameter as compared to the overall diameter of the tube. However, extreme difficulties have been encountered in providing sufficient material at the exact locations to materially increase the section modulus at the bearing seat areas of the spindles to absorb the wheel load and high bending stresses at these points. In prior methods of axle tube forming the spindle ends of the tube are usually first internally upset to gather metal at the approximate bearing seat area without reducing the outer diameter. Thereafter the spindle sections are forged down in a number of successive operations to obtain the desired diameters at the spindles. This method is objectionable in that it not only requires a number of different upsetting and forging operations but it is also difficult if not impossible to effectively control the metal flow within the tube to deposit sufficient metal at the desired areas. Furthermore, it is extremely difficult to maintain concentricity of the forged spindle section in relation to the inner diameter so that wall thickness in the spindle sections varies at certain points providing an unbalanced axle with weak sections.

The present invention contemplates forming, simultaneously with the forging of the spindle section, an area of the axle beam adjacent the spindle section for mounting the brake support or spider. Prior to the invention this brake support was pressed onto the axle tube inwardly adjacent of the spindle sections and welded to the axle tube, but there was no assurance that the brake support would be accurately concentric with the bearing seats on the spindle unless the brake support areas on the tube were turned down in a special machinery operation. This is important, because if the brake mechanism supports are not concentric on the axle beam the brake mechanism would be off-center which could only be remedied by machining certain brake parts to assure proper functioning of the brake mechanism. If only a brake support flange is provided in this manner to which the brake support will be attached by bolts the disadvantages are further compounded by machine tolerances inescapable in the bolted assembly.

To remedy this situation the present invention proposes to accurately size areas along the axle beam for the brake supports simultaneously with the forging of the spindle sections to concentricity with the diameter of the spindle sections. As a further feature and added advantage, the correctly sized brake support areas on the tubular axle beam are conveniently used to locate and center the axle during machining of the bearing seats on the spindle thus assuring exact concentricity of the bearing seats at both ends of the axle without complex machining fixtures.

In general the present invention proposes to provide a tubular vehicle axle made from a single sheet of steel, formed into a tubular beam and seam-welded along its entire length to provide a tube. In the preferred embodiment the center section of the beam is of rectangular cross section and the ends are cylindrical. Thereafter the ends of the beam are swaged down and internally set up on one machine operation, then heat treated and quenched. After this, the machining operations for the bearing seats and threads at the spindle sections are carried out and the brake supports are welded on the formed beam areas provide a finished axle assembly ready for painting and storage, and eventual use.

Although prefabricated extruded seamless steel tubes may be used to make this axle, it is preferred to make a tubular beam from a single steel plate seam welded along opposite edges because of better achievement of uniformity of wall thickness and thus better deflection characteristics.

Accordingly, the present invention provides a novel method of making one-piece tubular vehicle axle beams in which wheel bearing spindle sections at both ends of the tube are swaged and simultaneously internally upset first at one end and then at the other end in accordance with an automated cycle.

It is a major object of the present invention to provide a novel method of forming a tubular axle beam wherein the spindle sections are swaged at opposite ends simultaneously with forming accurately concentric brake support attachment areas on the beam.

A further object of the invention resides in the control of metal displacement and disposition during the swaging-down operation for the spindle sections in a method of making a tubular axle beam to provide maximum cross section wall areas at desired locations for increased section modulus.

Still another object of the invention is to provide a wholly automated swaging operation for spindle sections of tubular members in which the heating, swaging and transfer steps are cycled to provide a continuous operation requiring no manual handling throughout the operation.

A still further object of the invention is to provide a novel method of accurately sizing brake support areas in concentricity with the spindle sections of tubular axle beams which subsequently may be used to locate and center the axle during machining of bearing seats on the spindles.

A further object of the invention resides in the accurate positioning of the tubular axle beams along a common reference line prior to the end swaging operation to effectively control heating and swaging of only a desired length of the tube.

Still a further object of the present invention is the provision of a novel manufacturing method to produce tubular axles which includes special automated work stations and transfer means.

Another object of the invention is to provide a novel method of forming a tubular axle beam wherein a single flat sheet of metal is bent about an axis parallel to its length to form a beam having a rectangular center section and cylindrical end sections.

It is another major object of the present invention to provide a novel method of manufacturing a one-piece tubular vehicle axle beam embodying forming a hollow beam and swaging integral thickened wall spindle sections at both ends of the beam.

A still further object of the invention is to provide an improved tubular vehicle axle beam made from a single weld tubular member having integral swaged spindle sections at both its ends with bearing seat areas of thickened cross sections and the tubular axle beam being further provided adjacent the spindle sections with brake supports such as spiders directly welded upon the beam to provide a unitary structure of great strength and rigidity.

Another object of the invention is to provide a novel method of making a one-piece trailer or like axle beam by bending a single sheet of metal about an axis parallel to its length to form a tube having cylindrical end sections, welding the adjacent longitudinal side edges of the sheet together, and then forming the integral end sections to provide wheel bearing spindles.

It is another object of the invention to provide a novel method of making a one-piece tubular axle beam having a rectangular welded center section and cylindrical end sections wherein the brake mounting support such as a spider is accurately located relative to the wheel bearing mounting sections.

Further objects of the invention will appear as the description proceeds in connection with the appended claims and the annexed drawings wherein;

Figure 1:
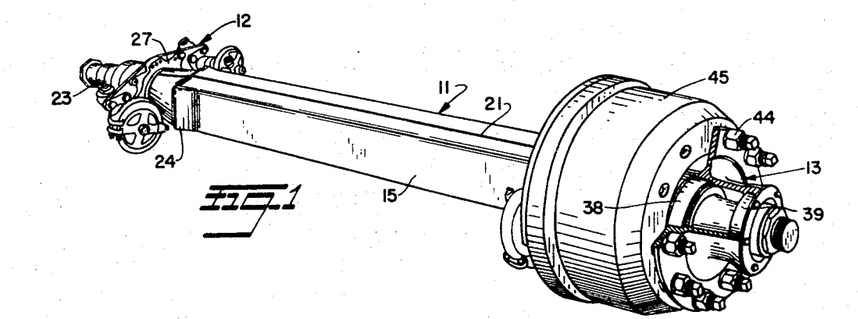
FIGURE 1 is a substantially perspective view of an axle assembly made according to a preferred embodiment of the invention, with the wheel hub omitted from one end and the wheel hub at the other end partially broken away and sectioned to show spindle and bearing detail.
Figure 2:
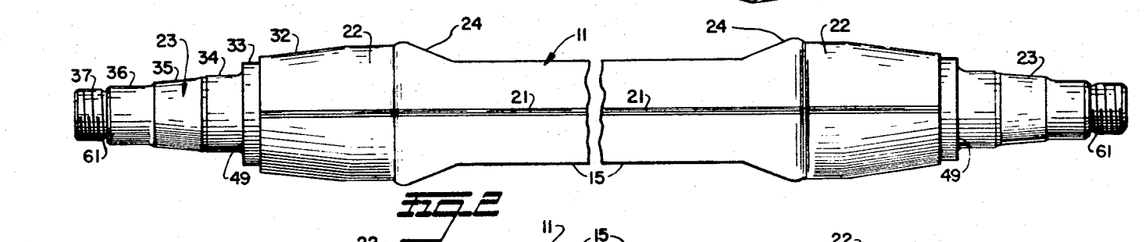
FIGURE 2 is top plan view of the axle beam apart from the remainder of the assembly.
Figure 3:
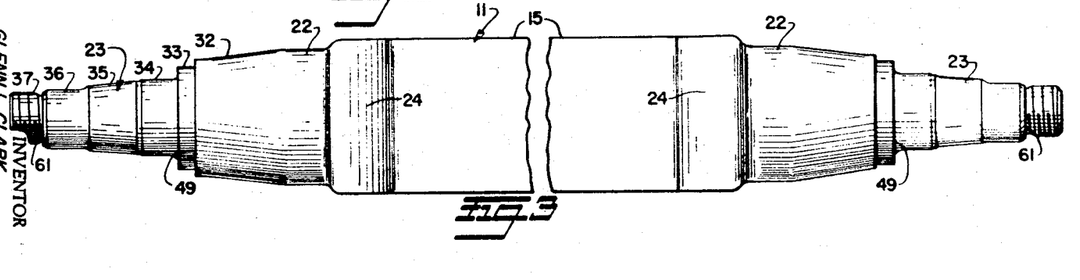
FIGURE 3 is a side elevation of the axle beam of FIGURE 2.

A trailer axle assembly according to the invention is shown in FIGURE 1 and consists essentially of a tubular beam 11, brake mechanism supports 12 fixed upon the beam at opposite ends, and wheel hubs 13 rotatably mounted on wheel mounting spindles at the opposite beam ends by means of suitable bearings.

Figures 4, 5, 6:
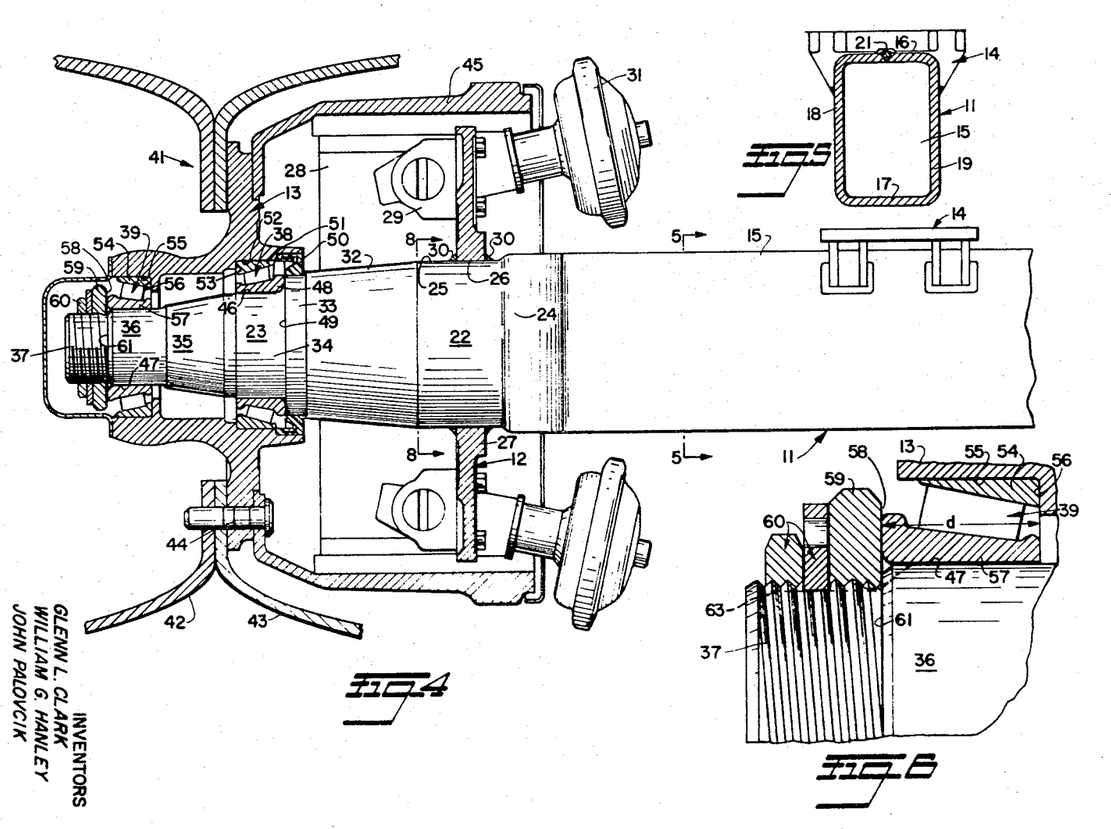
FIGURE 4 is an enlarged side elevation mainly in section at one end of the axle showing the spindle structure and bearing mounting.
FIGURE 5 is a transverse section of the rectangular center section of the axle beam substantially on line 5—5 of FIGURE 4.
FIGURE 6 is an enlarged fragmentary section showing detailed structure at the end of the axle assembly.

Axially inwardly of each support 12 the beam usually has secured thereupon at opposite ends spring mounts such as the saddles indicated at 14 in FIGURES 4 and 5.

Beam 11 is integral from end to end and is formed entirely from a single sheet of suitable thickness steel or like bendable metal that is die forged about an axis parallel to its length to form a closed contour cross-section and then the matching engaged opposite longitudinal edges of the formed sheet are welded together along their entire length in a straight line weld region that permanently holds the contour. This novel method of making the axle beam will be later described in detail.

The beam center section 15 is rectangular in cross section as shown in FIGURE 5 and of uniform size from end to end, having parallel horizontal top walls 16 and 17 and parallel side walls 18 and 19. The weld region 21 which joins the opposite edges of the original sheet is preferably located to extend straight along the middle of the top wall 16, so as to be in compression during normal body weight and other load stresses exerted on the beam in normal operation.

Figure 9:
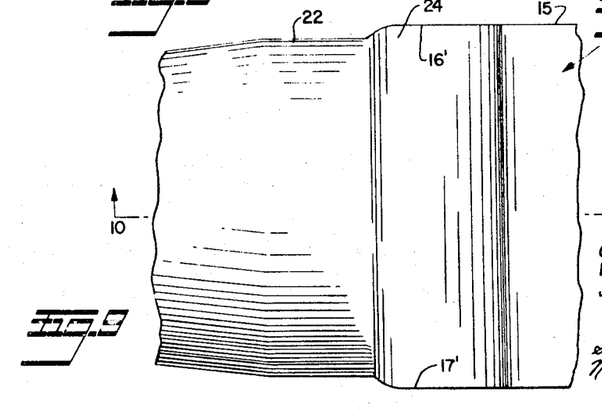
FIGURE 9 is an enlarged fragmentary view showing the transition section of the axle beam elevation.
Figure 10:
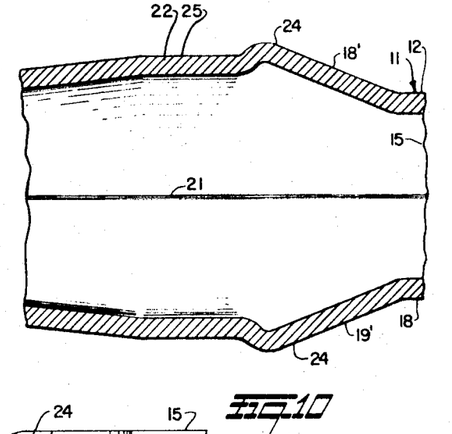
FIGURE 10 is a fragmentary section substantially on line 10—10 of FIGURE 9.

At each end the beam is reduced to form in outward succession the cylindrical brake mechanism mounting sections 22 and the wheel mounting spindle sections 23. Section 22 is cylindrical in cross section about a line in the plane containing the neutral axis of the beam, and the beam section 24 between center section 15 and the brake mounting sections 22 is a transition section of constantly longitudinally changing wall shape wherein the top and bottom walls of the center section merge toward each other as indicated at 16' and 17' in FIGURE 9 and the side walls are more sharply inclined oppositely outwardly as shown at 18' and 19' in FIGURE 10, all to merge into the cylindrical walls of section 22. At each transverse cross section of transition section 24 the shape is uniformly distributed about the beam axis.

In one form of the invention the beam center section 15 is about 6" in the vertical dimension and about 4" wide, the other parts being correspondingly dimensioned.

The brake mechanism mounting section 22 has a cylindrical external surface 25 adapted to snugly receive tthe cylindrical bore 26 of a brake mechanism mounting support 27. This support 27 is preferably the spider disclosed and claimed in copending application Ser. No. 479,222, filed Aug. 12, 1965 entitled Brake Mechanism Support and it has mounted thereon the brake shoes indicated at 28, the actuator therefor 29 and the fluid pressure motors 31 for the actuators. These motors and actuators and their cooperation with the brake shoes are preferably the same as disclosed in U.S. Letters Patent to F. T. Cox et al. No. 3,037,584 issued June 5, 1962. Support 27 is welded permanently onto the axle beam by continuous ringwelds 30 and it extends at right angles to the beam, with the actuators normally disposed at the forward and rearward sides of the beam, although shown 90° out of position in FIGURE 4 for clarity.

Axially outward of brake mount section 22 at each end (FIGURE 7) the beam has a first decreasingly tapered regular conical section 32, and relatively short reduced diameter cylindrical seal mount section 33, a reduced diameter cylindrical inner bearing mount section 34, a second decreasingly tapered regular conical section 35, and reduced diameter cylindrical outer bearing mount section 36 and a threaded terminal 37.

Inner and outer wheel bearing units 38 and 39 respectively as shown in FIGURE 4 are mounted on the spindle at sections 34 and 36 respectively, and they support the axle beam rotatably upon a wheel assembly 41, comprising hub 13 having dual ground engaging wheels 42 and 43 removably mounted thereon as by studs 44. The brake drum 45 is also secured on the hub by studs 44 and extends inwardly to enclose the brake mechanism.

Cylindrical surface 46 of section 34, and cylindrical surface 47 of section 36 are accurately smoothly ground to size to close tolerances and both are induction hardened after grinding. The inner race 48 of inner bearing unit 38 is snugly fitted upon surface 46 with its inner end in abutment with a smooth annular flat radial face 49 which for a purpose to appear is accurately ground in a plane at right angles to the beam axis. The outer race 51 of bearing unit 38 is snugly received within a cylindrical hub surface 52 with its outer end in abutment with a smoothly machined annular flat radial face 53 on the hub.

The outer race 54 of outer bearing unit 39 is fitted snugly within cylindrical hub surface 55 with its inner end in abutment with the smoothly machined flat annular radial face 56 of the hub. The inner race 57 of bearing unit 39 is snugly fitted over cylindrical surface 47 and its outer end is abutted by the flat smooth annular end surface 58 of an adjustment nut 59 threaded upon beam terminal 37 as shown best in FIGURE 4. It will be noted, as later explained, that in the assembly nut 59 is drawn tight until the inner peripheral part of surface 58 abuts the smoothly ground flat radial face 61 on the axle beam at the inner end of the threaded terminal.

It will be seen that as nut 59 is drawn tighter on the threads at 37 both inner and outer bearings will be loaded at the same time, the hub 13 solidly transmitting the force to the inner bearing. A suitable locking device indicated at 60 locks nut 59 in final position tight against face 61.

Figure 7:
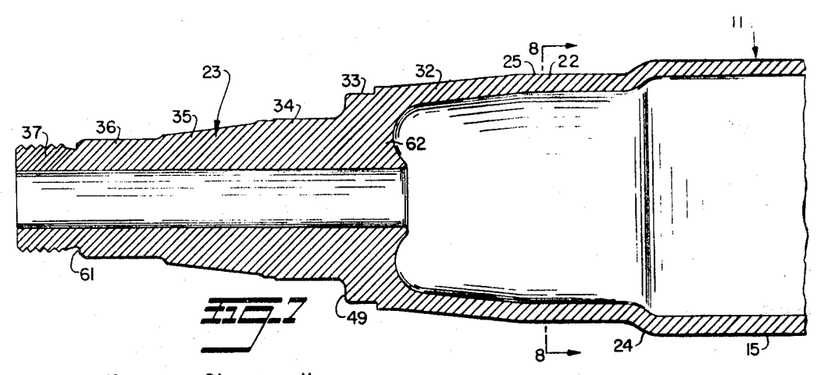
FIGURE 7 is an axial section showing the wall thickness and contour at each end of the axle beam.

As a consequence of the swaging of the spindle ends the cylindrical beam wall is thickened considerably at the bearing mount sections 34 and 36 as shown in FIGURE 7 and it has maximum thickness at the annular region 62 just axially inwardly of the larger inner wheel bearing where a sharp increase in bending stress is encountered.

Prior to assembly of the wheel bearings the radial faces 61 and 49 are accurately ground to locate them axially of the beam in parallel planes with a predetermined distance between them within very close tolerances, preferably about 0.002". Face 61 is preferably ground first to serve as a primary locating face in the assembly. The radial faces 53 and 56 of the hub are similarly accurately ground and located relatively axially within those tolerances. The bearing units 38 and 39 are each manufactured with their axial dimension, that is the distance $d$ indicated in FIGURE 6, between the effective opposite flat end abutment faces of the inner and outer races, very closely determined. Bearing 38 is first placed on section 34, and then bearing 39 is placed within the hub which is slipped over the spindle end until bearing 39 is on section 36. Thus, in the assembly with bearing 38 disposed between faces 49 and 53, and bearing 39 in end abutment with face 56, nut 59 is tightened until surface 58 abuts the inner race of bearing 39 at which time it starts bearing adjustment.

Then nut 59 is further tightened until surface 58 is tight against face 61. At this point, due to the known dimensions of the bearings and the very close tolerances in axial location of the radial faces on the hub and the axle beam, the wheel mounting bearings will be essentially properly adjusted within an acceptable tolerance range.

The foregoing mode of assembly automatically assures correct wheel bearing adjustment even with unskilled mechanics. It dispenses with the cut and try use of shims hitherto used in such bearing adjustments and so is less expensive and faster as well as more accurate.

The axle assembly of the invention represents a desirable improvement in the art in that it provides a stronger axle using less weight of steel. This is accomplished essentially by forming the single weld rectangular center section 15 resulting in an optimum which provides at this region increased resistance to bending, torque and other stresses normally encountered during vehicle operation. For example the section modulus of an axle beam externally dimensioned four by six inches in the rectangular center section with a wall thickness of about $11/_{32}$" is about 9.23, as compared to prior hollow trailer axle separate center sections of square cross section and forced by two welds joining U-shaped upper and lower members having a section modulus of only 7.49.

The axle provides an assembly wherein optimum use is made of the weight of metal by planned distribution. The center section is thin walled compared to the spindle sections since its wall thickness may be the minimum dictated by the intended axle load. This provides an axle assembly of minimum weight.

The axle assembly is described and claimed in copending application Ser. No. 483,550 filed Aug. 30, 1965 (T–148), and entitled Trailer Axle Assembly and Method of Assembly.

The axle making method

Figure 11:
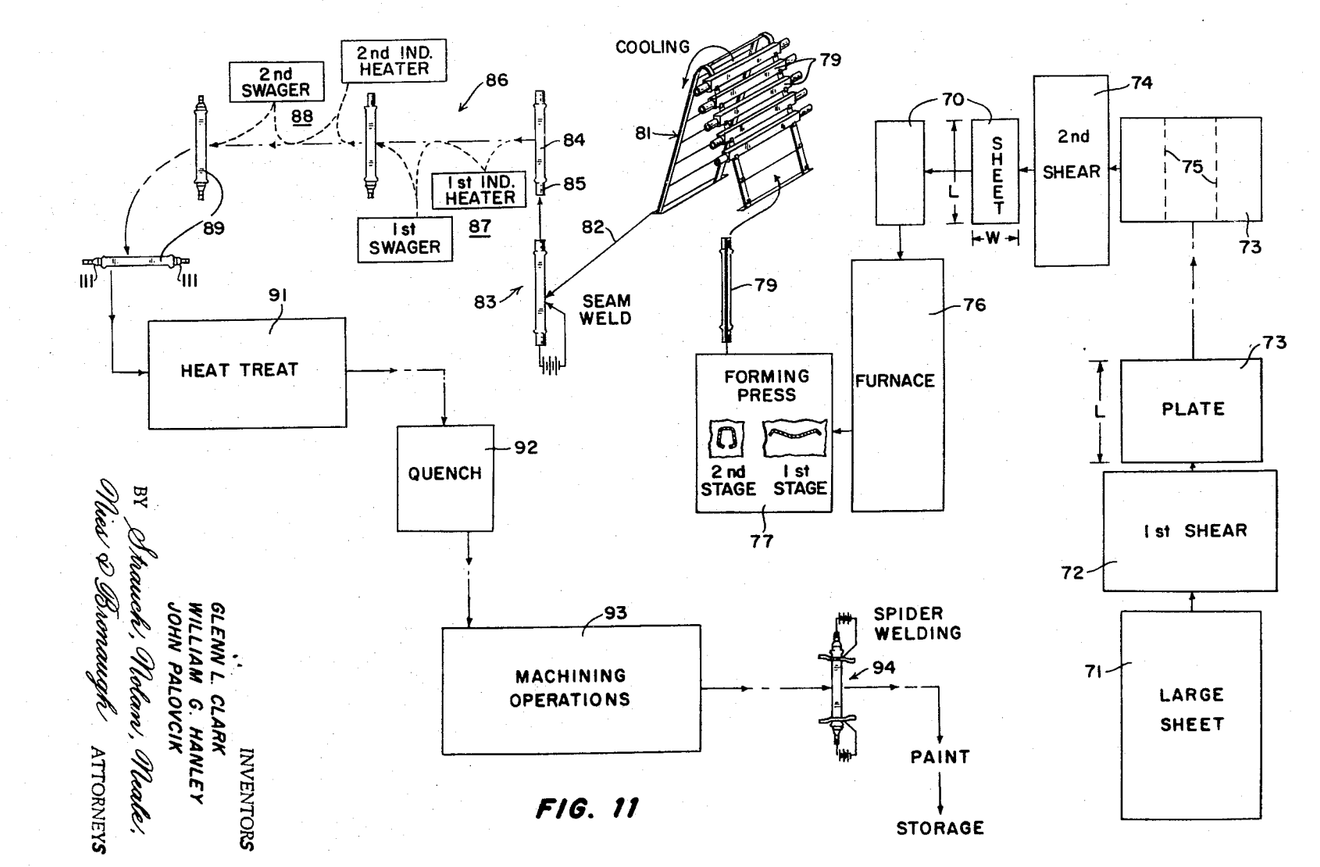
FIGURE 11 is a diagrammatic view showing the sequential steps of forming the axle beam from a single sheet of metal to the axle assembly.
Figure 12:
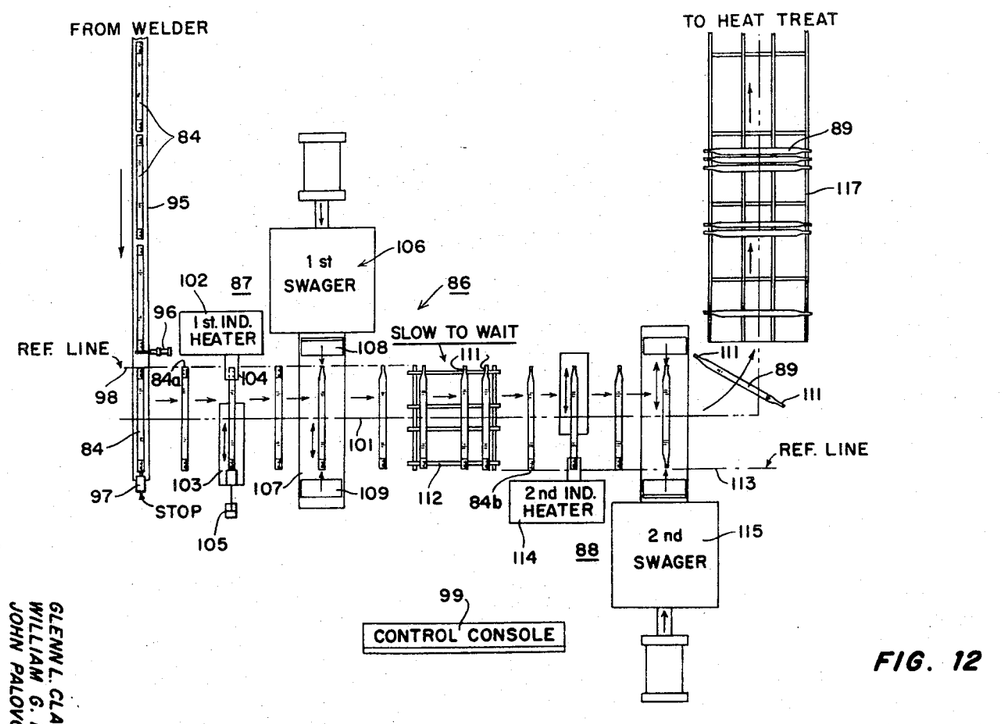
FIGURE 12 is an enlarged view of part of diagrammatic FIGURE 11 showing further detail.

With specific reference to the diagrammatic showing in FIGURES 11 and 12 the steps of manufacturing the tubular axle beam 11 with attached brake spiders are illustrated.

The tubular beam is made from a flat sheet or plate of steel 70 of sufficient thickness as determined by the desired wall thickness of the axle beam center section 15 and of a length and width that determines the final parameters of the finished axle.

Sheet 70 is initially cut from a large plate 71 of steel stock. For heavy duty axle beams this plate is about 5/16" to 1/2" thick. This plate is cut in a shear 72 from which a length of plate 73 is cut whose width L determines the finished length of the axle. Plate 72 is suitably transferred to another right angle shear 74 to be cut along lines 75 into several smaller sections, each of which appears as indicated at sheet 70. The width W of sheet 70 determines the diameter of the finished tubular axle beam and this width W of the blank 70 is held to relatively close tolerances—in this instance plus or minus .015".

Sheet 70 then passes through a furnace 76 in lengthwise direction to properly heat the sheet for subsequent forming operation.

Sheet 70 leaves furnace 76 to be transferred directly into a two-stage forming or bending press 77 as by a cross-over conveyor. Sheet 70 is shaped in a first forming stage into a winged configuration generally shown at 78 and immediately thereafter in a second forming stage into the tubular blank 79. As will appear, in the preferred embodiment of the invention the center section of the beam being formed is of rectangular cross section and the two ends are of cylindrical cross section. This will be explained in the later description of forming press 77. Blank 79 is then transported to a waiting or cooling station 81 which may comprise a tower like conveyor structure on which the blanks move up on one side and down the other to be deposited onto a horizontal conveyor indicated at 82 which feeds them to automatic welding station 83. Conveyor 82 preferably has means to orient the tubular blanks 79 so that the longitudinal gap 140 between the opposite longitudinal edges of the original sheet is on top for accessibility.

At welding station 83 the opposite longitudinal edges of the sheet are forced together in a suitable jig and seam welded together permanently by any suitable process forming a solid homogeneous non-porous seam straight down the length of the tube. The formed welded tubular blank is shown at 84, and it consists in the preferred embodiment of rectangular center section 15 and straight cylindrical end sections 85.

After the welding operation welded tubular blank 84 is transferred to a grinding station (not shown) to remove the excess welding material at the end sections 85 and prepare the blank for the final spindle swaging operations in the automated swaging line indicated at 86. However, grinding may be done after swaging if necessary at all or, alternatively, the entire tube may be sized in a swager to a fixed outside dimension which can be done either hot or cold.

The swaging apparatus, which will be more fully described later, is preferably fully automated throughout the entire swaging cycle and consists of two identical heating and swaging stations 87 and 88 respectively which are spaced apart and positioned opposite each other so that the opposite ends of the tubular blank 84 may be swaged successively without having to turn the blank around. During this operation the brake support region and the wheel bearing spindle sections are formed to the shape shown in phantom lines in FIGURE 24, and the cylindrical sections 22 for mounting the brake spiders are formed accurately concentric with the spindles.

From the swaging apparatus 86 the formed and swaged tubular members 89 are transferred to a heat treating station 91 in which they are properly heat treated to equalize the effects of the previous welding and swaging operation and to give the tubes added strength.

The tubular axle beam 89 is then quenched at 92, tempered in a draw furnace and further transferred to the machining stations 93 where the bearing seats 34 and 36 on the spindles are finish-machined and the locknut threads 37 are cut on the swaged spindle ends.

After machining of the spindle sections, the axle beams are provided with the brake mechanism supports 12 which are welded thereto in the welding operation indicated at 94. The spider members 27 are introduced over the spindle ends and press fitted onto the swaged cylindrical brake support seats 22 adjacent the spindle sections and ringwelded thereto. Since these spider mounting sections 22 are simultaneously swaged and sized with swaging of the spindle sections absolute concentricity is assured so that the installed welded spider of other brake support will be accurately centered in relation to the centerline of the axle thereby eliminating subsequent adjustment or machining operations on the brake mechanism itself.

Finally the now finished tubular axle consisting of beam 11 and supports 12 may be painted or sprayed with a protective coating and is ready for storage or shipment.

Referring to larger scale FIGURE 12 the tubular beam blanks 84 after being welded are transferred lengthwise on a conveyor 95 to the automated swaging system 86.

At a certain point, conveyor 95 has an automatic escapement mechanism 96 to stop the transfer of blanks 84 and to release them one by one at certain timed intervals. The released blank 84 abuts a stop 97 which positions one end 84A of the blank in line with a reference plane 98. This reference plane may include an electronic device to assure that the end 84A of the blank is perfectly located for the subsequent heating and swaging of this end. Alignment at this point is very important to assure that only a desired length of the tubular blank will be heated and the tubular blank be subsequently clamped in proper position at the swager to assure desired uniform length of the spindle sections.

The reference point 98 when properly aligned with the end of the tubular blank 84 initiates the automated and timed transfer, heating and swaging cycle which previously has been started by depressing the start button (not shown) at the electronic control console 99.

Blank 84 is gripped at two spaced positions along its length by suitable automatic gripping arms (not shown) which are suspended from an overhead conveyor indicated by the centerline 101 and transferred from supply conveyor 95 to the entrance of the first induction heating station 102.

At induction heating station 102, blank 84 is placed and automatically released upon a support table 103 in front of the induction heater 104 of the first swaging station 87 with the end of the blank positioned on the reference point 98. Support table 103 is provided with means such as a push-up cylinder 105 to push the blank a selected distance into the heater 104. The spindle end 84A of the blank is preferably heated simultaneously at different degrees of heat, that is, one section of the spindle length may be heated to a higher degree than another. In a particular example, for instance, the outer end of the spindle was heated to 2200° F. and the remainder to only 1000° F.

This selective heating can be accomplished in an induction heater by any specific coil arrangement. The reason for the difference in heat is, that only that part of the spindle section which receives the most work needs to be heated to a higher degree whereas a lower heat would suffice for the part receiving less work. By this arrangement, heating power is saved and the metal structure at the heated end of the axle will be improved since no section of the metal will be unnecessarily overheated.

After the end 84A of the blank has been properly heated according to a programmed cycle, it is automatically retracted from the induction heater 104 onto the support table 103 where it is again gripped by the overhead conveyor means and transferred to the swaging machine 106 of the first swaging station 87. At the same time another tubular blank 84 is transferred from the supply conveyor 95 to the first induction heater.

The swaging machine 106, which may be conventional except for the swaging dies, is for the present purpose equipped with a support and clamping table 107 in front of the input end of the swager which is provided with a front slide 108 and a rear slide 109 automatically longitudinally slidable on the support. These slides are preferably provided with conventional chucks (not shown) which are rotatable in the slides to receive and clamp the blank 84. At the time the blank 84 is deposited on the support table, the slides 108 and 109 are both retracted to spaced apart position so that the blank can be placed and held between them with the heated end 84A positioned on the reference point 98. The slides then advance towards each other and clamp the blank between them but with the front end free, after the overhead conveyor releases the blank. The slide and blank assembly then advances towards the swager for the insertion of the heated end 84A into the swager head, to perform the swaging operations which will be described in detail in connection with FIGURES 25–30 and produce the beam end shape shown in FIGURE 24.

At the first swager 87 accurately shaped brake mechanism mount and spindle sections are formed very rapidly, the whole swaging operation for one spindle including the heating taking not more than one to two minutes in apparatus developed for carrying out the cycle.

After the spindle section has been swaged, the blank is retracted from the swager and released from the sliding chucks. At the same time the following blank 84 is inserted into the first induction heater 102.

The blank having the swaged end indicated at 111 is now picked up by a moving conveyor and transported to a slow travelling intermittent floor conveyor 112. After reaching the end of conveyor 112 blank 84 is automatically positioned with its unswaged end 84B on another reference point comprising plane 113 which determines the correct longitudinal alignment of the blank for the swaging of the spindle section at the other end of the blank. To this end an identical second induction heater 114 and second swager machine 115 are located opposite side conveyor 112, so that there is no necessity to rotate the blank for the second swage operation. The operations of the second heating and swaging units are identical in all points to the first and need not again to be described here, and the blank emerges with the opposite end swaged at 111 to the shape of FIGURE 24.

Due to the dual opposed arrangement of the swaging stations a speedy substantially continuous automatic operation is provided in which the first induction heater 102 and second swager 115 and the first swager 106 and second induction heater 114 are cycled to operate simultaneously which provides for an even more rapid operation. The time for the entire operation for one tubular blank to go through the two swaging lines in the disclosed embodiment is normally from between 7 to 8 minutes. If there is a delay in the second swaging unit for some reason the slow moving intermittent floor conveyor 112 is allowed to fill up. When this occurs the first induction heater may be automatically cut-off until the cause of the delay is removed.

After the finish swaged blank leaves the second swager, it is immediately transferred to a floor type conveyor 117 which transfers the blanks to the heat treating station 91 of FIGURE 11.

Beam forming

Figure 13:
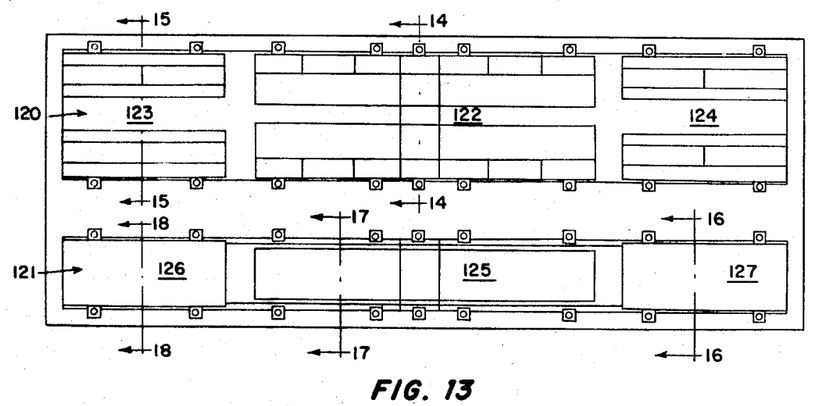
FIGURE 13 is a top plan view of the forming press of FIGURE 11.

FIGURE 13 shows diagrammatically in top plan the arrangement of forming dies in the forming press 77 of FIGURE 11. The first stage forming station is indicated at 120, and the second stage forming at 121.

In the first stage are mounted cooperating top and bottom forming die members providing relatively a long beam center section forming die at 122 and two shorter beam end section dies at 123 and 124. In the first stage the sheet 70 is partially formed as will appear, and it is then transferred manually or automatically to the second stage. In the second stage are mounted cooperating top and bottom forming die members providing a relatively long beam forming center section die 125 and two shorter beam end section dies 126 and 127.

In each stage the opposite ends of the center section dies are slightly spaced from the adjacent ends of the end forming section dies, and it is in these spaces that the transition section 24 of the axle beam 11 is formed during the beam forming method now to be described.

Figure 14:
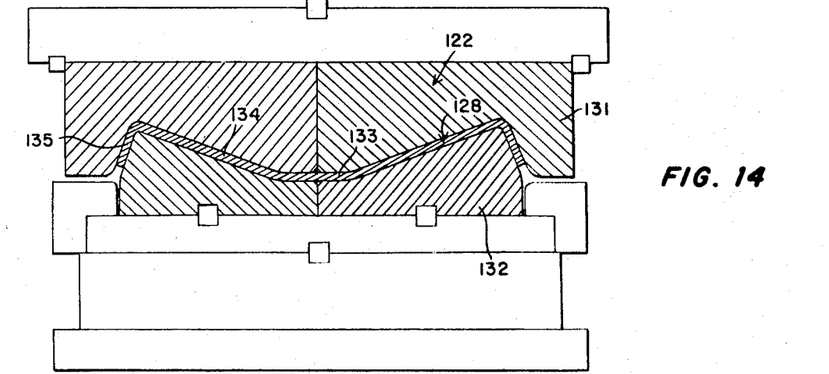
FIGURE 14 is a section on line 14—14 of FIGURE 13 showing the first stage forming of the sheet at the center section.

Starting with the first stage, the flat sheet 70 sheared to size is placed between the upper and lower dies which are brought together by any suitable means. FIGURE 14 shows the center section die structure and action at the first stage, and FIGURE 15 shows the end section die structure and operation of the first stage.

Figure 15:
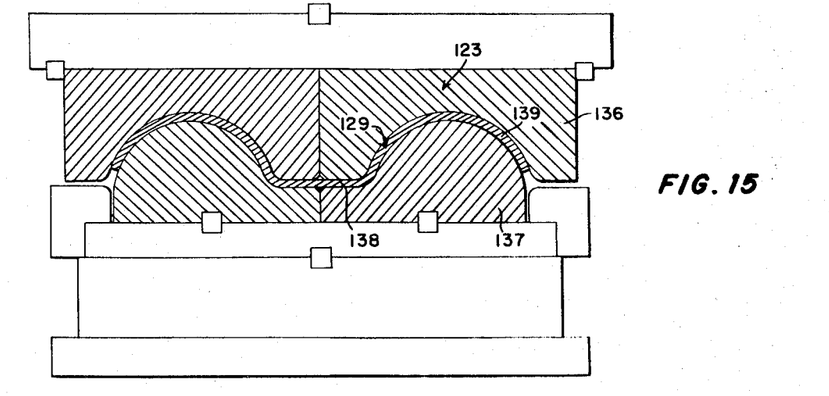
FIGURE 15 is a section on line 15—15 of FIGURE 13 showing the first stage forming at both ends.

FIGURES 14 and 15 show the first stage condition as the upper and lower die members complete their forming action, the partially formed center and end sections of the sheet being shown at 128 and 129 respectively.

Figure 8:
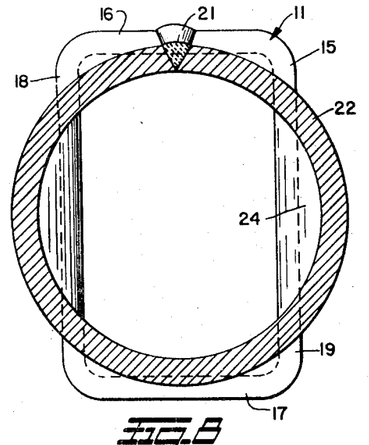
FIGURE 8 is a section substantially on line 8—8 of FIGURES 4 and 7 showing changes in beam cross section.

With reference to FIGURE 14, it will be seen that the forming surface of upper center die member 131 cooperates with the forming surface of lower center die member 132 to form in the sheet a longitudinal flat central area 133, equally angularly inclined longitudinally flat regions 134 of the same size and longitudinal right angle inclined side regions 135 of the same size. At the same time as shown in FIGURE 15 the forming surface of each upper end die member 136 cooperates with the forming surface of lower end die member 137 to form flat longitudinal central areas 138 and curved substantially circular cross-section side regions 139 of the same size. The forming surfaces are such that areas 133 and 138 are of the same width and in longitudinal alignment, and area 133 corresponds to the axle beam bottom wall 17 shown in FIGURE 8.

Figure 16:
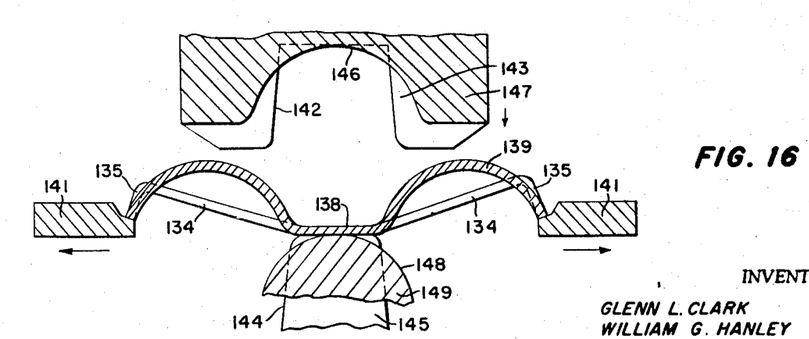
FIGURE 16 is a section substantially on line 16—16 of FIGURE 13 showing the partially formed sheet in the open second stage die.

Now the first stage formed sheet is shifted to the second stage 121 where FIGURE 16 illustrates its initial position with the central flat undeformed areas 133 and 138 resting on the lower die and the tips of the side regions 135 and 139 resting on shiftable support rails 141, with the upper die members in raised open position.

Figure 17:
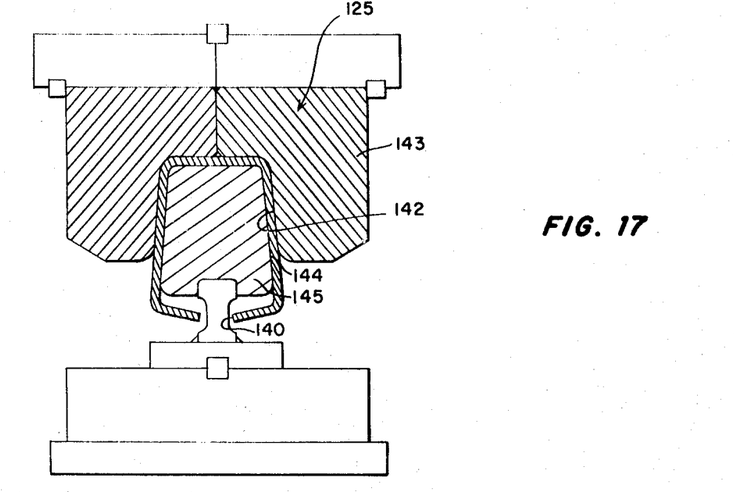
FIGURE 17 is a section on line 17—17 of FIGURE 13 showing the second stage forming at the center section.
Figure 18:
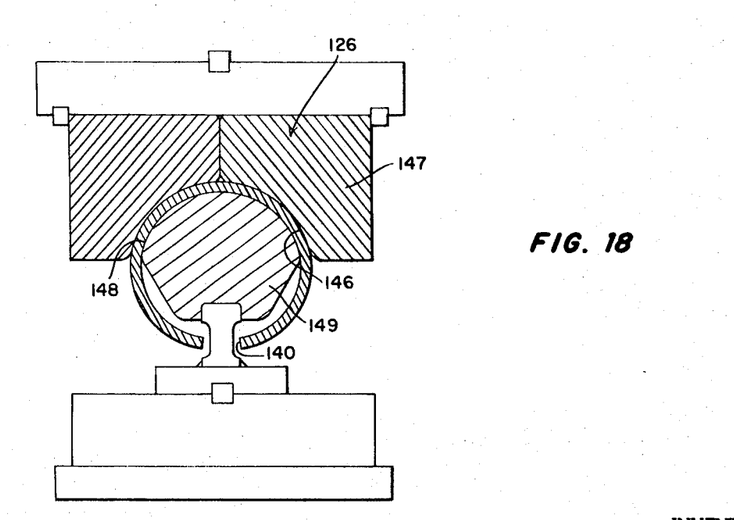
FIGURE 18 is a section on line 18—18 of FIGURE 13 showing the second stage forming at the ends.

With reference to FIGURES 16–18, it will be seen that the final forming surface 142 of upper center die member 143 cooperates with the similarly contoured surface 144 of the lower die member 145 to bend the side regions around to the position shown in FIGURE 17 which approximates the desired beam center section contour except for the gap, and the cylindrical forming surfaces 146 of upper end die members 147 cooperate with the cylindrical surface 148 of lower die member 149 to bend the end sections to the contour shown in FIGURE 18 which is approximately cylindrical but with the same gap 140 between adjacent longitudinal edges of the original sheet. During the downward forming movement of die members 143 and 147 the side rails 141 are oppositely moved out from under the sheet to permit the complete forming action.

The lower end dies 149 are hinged and hydraulically retracted out of the second stage die to enable removal of the formed tube from the die.

Figures 21, 23:
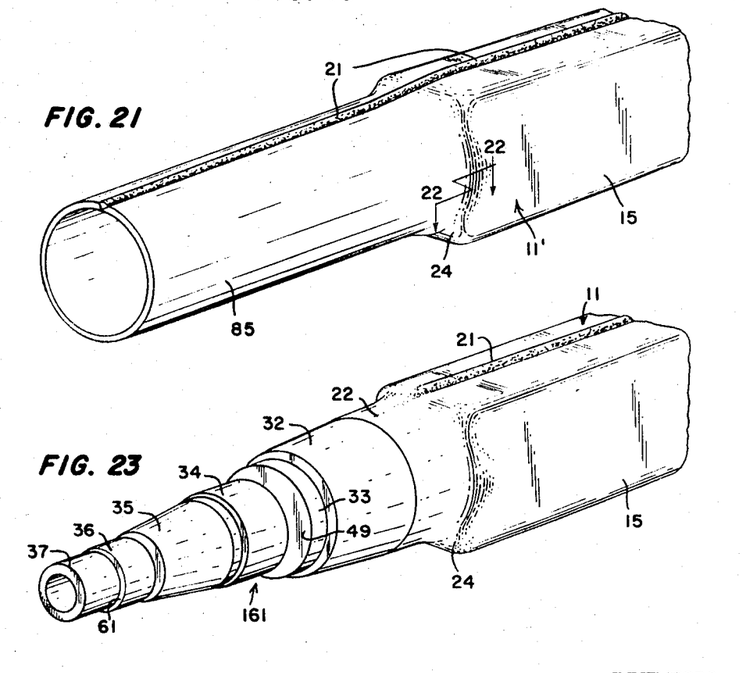
FIGURE 21 is an enlarged generally perspective view of an end of the tubular beam as it appears immediately following the welding operation.
FIGURE 23 is a view corresponding to FIGURE 21 showing the beam end after swaging and machining.
Figure 22:
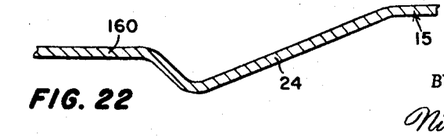
FIGURE 22 is a fragmentary section susbtantially on line 22—22 of FIGURE 21 showing the beam wall shape at the transition sections.

As a consequence of this forming action shown in FIGURES 14–18, the original flat sheet 70 is converted to the preliminary essential axle beam structure, one end of which is shown enlarged in FIGURE 21 and designated as 11′, except for the weld region 21. Both ends are identical.

The next step is to place the preliminary formed beam in a suitable jig in the welding station 83 of FIGURE 11 where the beam is clamped to close the gap 140 and the adjacent longitudinal edges are welded permanently together at 21 along a straight line parallel to the axis.

Figure 19:
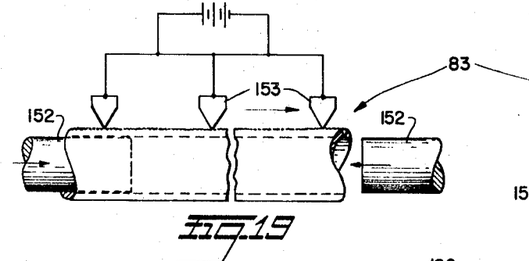
FIGURE 19 is a fragmentary side elevation illustrating the welding operation.
Figure 20:
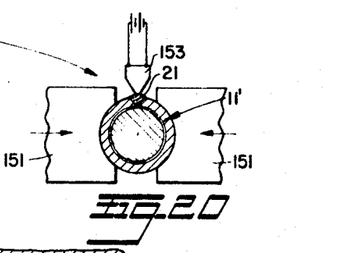
FIGURE 20 is a section showing the holding of the formed beam during welding.

Referring to FIGURES 19 and 20, the partially formed beam with gap 140 on top is laterally clamped between jig elements 151 suitably urged together as shown by the arrows, the beam being internally supported along its length during the welding by oppositely inserted back up bars 152 which may be coated with flux to aid the welding operation. Since, see FIGURE 16, the outer diameters of the cylindrical end portions leaving the forming press are about equal to the long dimension of the rectangular center section, uniform diameter back up bars may be used which underlie the entire weld region in a straight line. Welding is done in this instance by three spaced welding heads 153 positioned above gap 140. The welding heads travel along the gap of the tubular blank to simultaneously seam-weld the blank in three sections, that is, each of the welding heads welds one third of the length of the gap, and the provision of three welding heads working simultaneously performs the welding operation much faster.

As a consequence of the welding operation the preliminary form 11′ of the axle beam appears as shown in FIGURE 21, consisting of the rectangular center section 15 which is in final shape, the transition sections 24 which are in final shape, and identical cylindrical end sections 85 ready for the swaging operations to form the brake support mount and wheel mounting spindle sections. It will be noted that at this point the entire hollow beam is of the uniform wall thickness of the original sheet, from end to end.

Swaging

Figure 24:
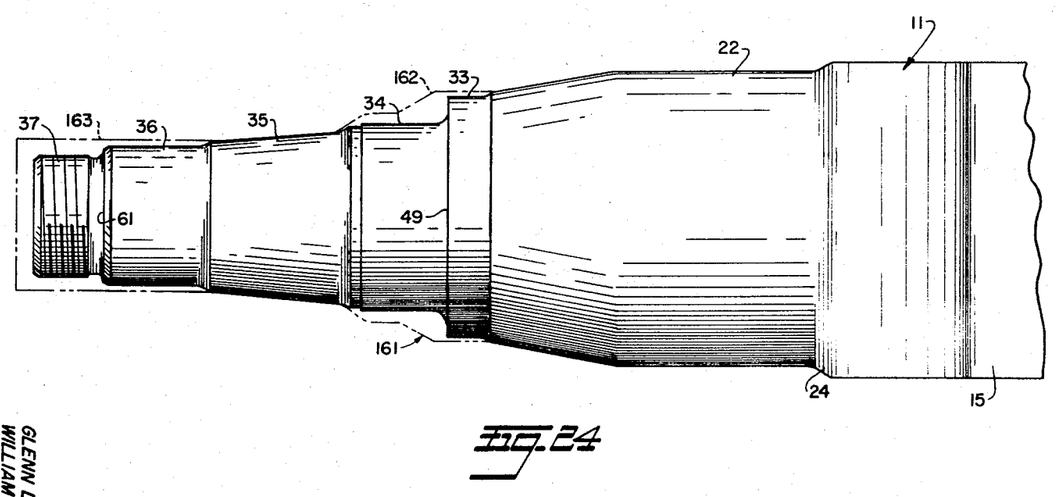
FIGURE 24 is an enlarged side elevation showing a swaged beam end with the machining operations indicated.

After the beam has attained the form of FIGURE 21, it is swaged at the opposite ends to the form indicated at 111 in FIGURES 12 and 24 and then machined to the full line contour shown in FIGURES 23 and 24.

During the swaging operation, the beam section at 22 which is to mount the brake spider substantially retains its formed cylindrical shape and wall thickness but is accurately conformed to that cylindrical shape and the desired size by the entrance portion of the swaging dies to be described. In addition the conical beam section 32 is swaged to final shape, as well as the conical section 35. Between sections 32 and 35 the beam is formed to the external shape indicated at 162 in FIGURE 24, and the end region is swaged to the external shape indicated at 163 in FIGURE 24. The wall thickness and internal shapes at the swaged beam ends are shown in FIGURE 7, bearing in mind that the machine operations indicated in FIGURE 24 are to be performed.

After the swaging operation the beam ends are machined to final form. This involves cutting away the metal between the phantom and full lines in FIGURE 24 to accurately form the seal mount 33, the cylindrical inner bearing mount 34, the outer cylindrical bearing mount 36 and the terminal at 37, as well as the parallel radial faces 49 and 61, as described.

FIGURES 25–30 illustrate the swaging operation according to a preferred manner and apparatus.

Figure 29:
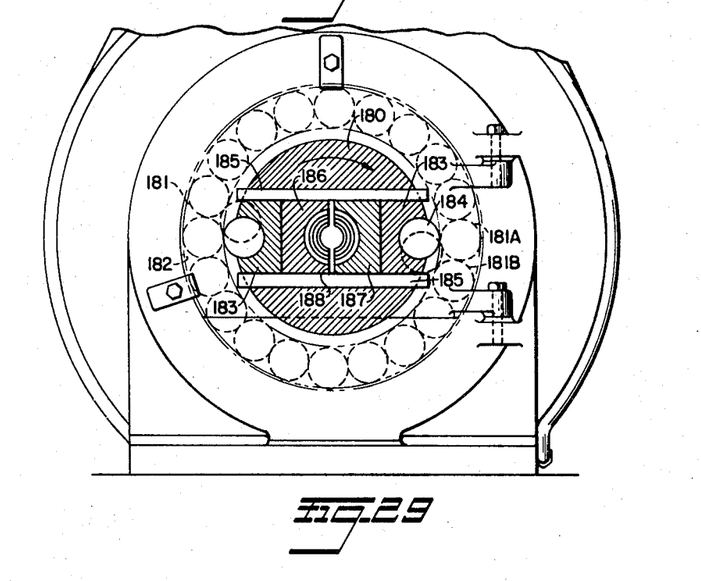
FIGURE 29 is an end view partly in section showing the swaging dies and operation.
Figure 30:
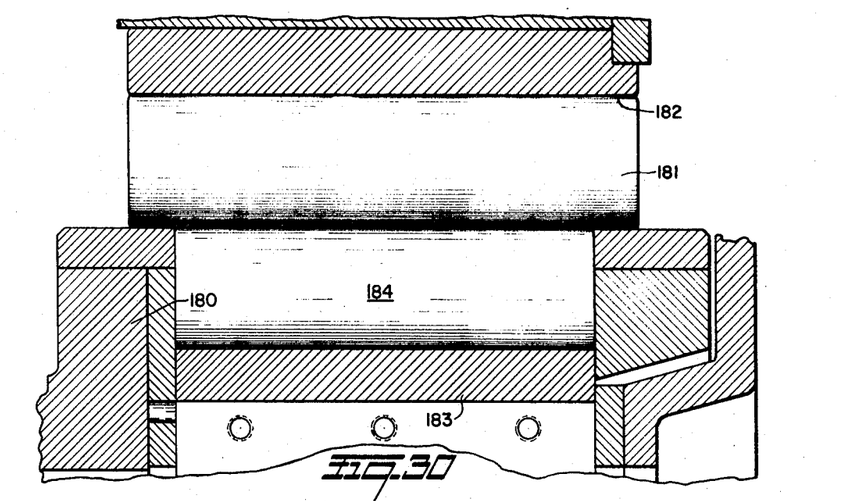
FIGURE 30 is a fragmentary view in section showing details of the swaging head.

A representative form of swager head is illustrated in FIGURE 29 in which a head 180 is powered to be rotated within a ring of rollers 181 suitably supported in a cylindrical raceway 182 in the housing of the swager. This head may be provided with two or more reciprocating hammers 183 each of which carries a roller 184 for rolling contact with the outer ring of rollers 181 to cause reciprocation of the hammers within the confines of wear plates 185 on the head slidably supporting the hammers when the head 180 rotates. The inner ends of the hammers are adapted to abut suitably shaped swage die members 186 and 187, also shown in section in FIGURES 25–27, which are also slidably mounted on wear plates 185.

As head 180 rotates, referring to FIGURE 29, full diameter contact between hammer roller 184 and a ring roller 181A in the position illustrated, which position is duplicated at diametrically opposite sides of the head, moves both hammers and both swage dies fully inwardly to the full line position of FIGURE 29. When the hammer rollers 184 reach the position where they engage both adjacent ring rollers 181A and 181B as illustrated in dotted lines in FIGURE 29, the hammers and dies may slide to their outer positions. Thus, as will appear, there results a series of intermittent hammer blows by the dies on the tube end inserted between the dies.

Dies 186 and 187 are complementary and are formed with stepped surfaces corresponding to the shapes desired to produce the swaged contour shown at 162 of FIGURE 24.

The tube 84 is suitably mounted in a mechanism that rotates the tube about its axis and feeds it axially into the swaging die.

As shown in FIGURE 29 the adjacent inner surfaces 188 of the dies are slightly spaced apart when the die is closed which is desirable to achieve complete roundness of the part to be shaped and to prevent the formation of edges on the metal of the part when the dies come together.

Figure 25:
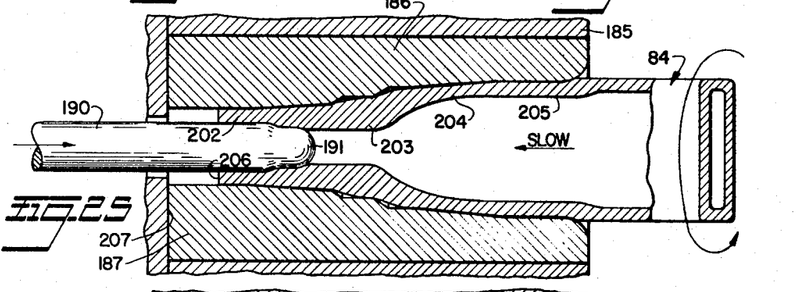
FIGURES 25, 26 and 27 are elevations mainly in section showing steps in the spindle swaging operation.
Figure 26:
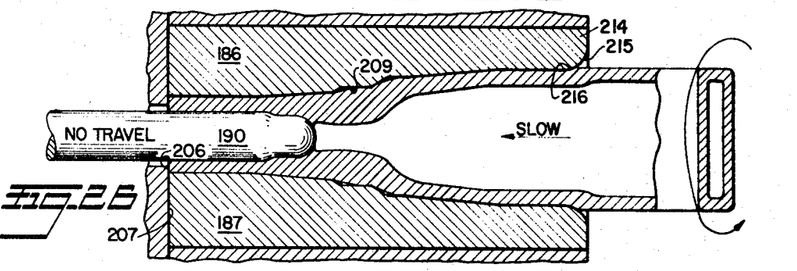
Figure 27:
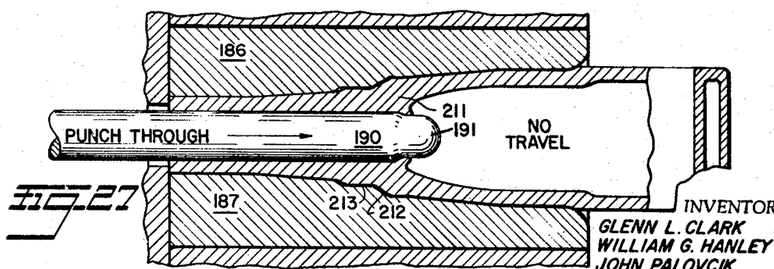
Figure 28:
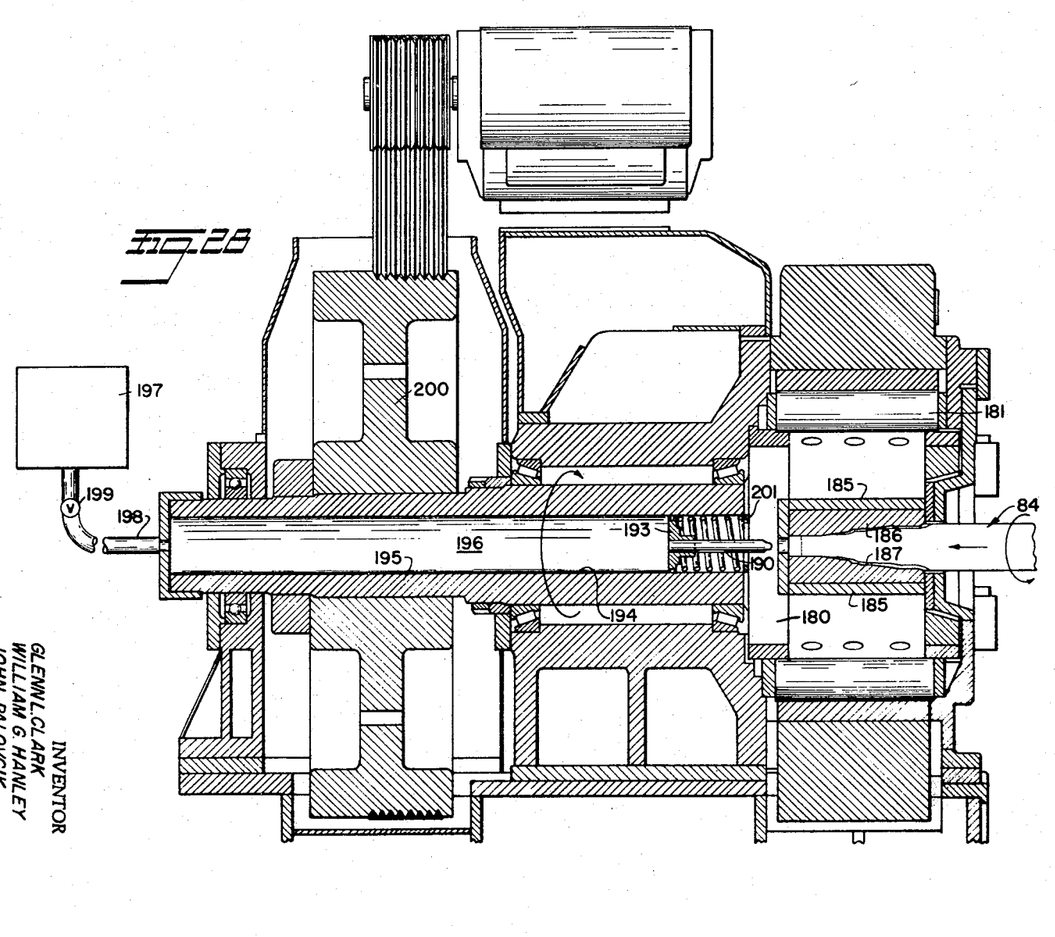
FIGURE 28 is a side elevation mainly in section showing the main components of a swaging apparatus.

With particular reference to FIGURES 25–27 at the beginning of the swaging operation the heated cylindrical end of the formed and welded tubular blank 84 is rapidly fed into the rotating head containing dies 186 and 187 to quickly reduce the diameter and shape of the rough outline of the spindle section to the approximate position of FIGURE 25. The additional infeed thereafter is slower and more accurately controlled. At this point a concentric mandrel 190 is introduced into the hollow blank 84 from the other side of the swaging machine. Mandrel 190 comprises a cylindrical pushrod of substantially equal diameter throughout its length with the exception of the tip portion 191 which is of slightly smaller diameter for a reason to be explained.

Referring back to FIGURE 12 the mandrel is diagrammatically illustrated to be supported and powered by a hydraulic motor 192 behind the swaging machine capable of exerting a large amount of thrust. It will be understood that the mandrel is preferably supported such as to be free to rotate to reduce or eliminate torsion forces when the mandrel establishes connection with the rotating tube. The diameter of the larger portion of the mandrel establishes the final internal diameter of the finished spindle section. In one form as in FIGURE 28, the mandrel 190 may be supported by a sealed periphery disc 193 capable of rotation and sliding within the bore 194 of hollow shaft 195 that drives the head 180. The space 196 within bore 194 is connected to a source of fluid pressure 197 by a conduit 198 having a valve 199, so that the mandrel may be shifted to the right and maintained against the action of return spring 201 by air or oil pressure. Shaft 195 is driven by a motor and belt power unit connected to pulley 200 on the shaft. FIGURE 25 illustrates the position and condition of parts at the initiation of fine infeed of the rotating tube blank 84. At this point the mandrel 190 has partially entered the hollow partially swaged spindle end. The dies 186, 187 in conjunction with the mandrel insert have formed an end portion 202 of considerably reduced diameter but increased wall thickness which extends from a shorter portion 203 of even more increased wall thickness. This thicker portion 203 merges into a sloping portion 204 of larger diameter but considerably thinner wall section which in turn extends into a straight portion cylindrical section 205 of about the same or slightly smaller diameter than the original diameter of the tube end 85 and may be of slightly increased wall thickness as compared to the original wall thickness of the blank 84. These last mentioned portions 204 and 205 are formed by the entrance portions of the dies.

Referring now to FIGURE 26, as the rotating tubular blank 84 is further fed inwardly at a controlled slower rate, inward movement of the mandrel 190 is stopped temporarily until the end 206 of the blank bottoms against an abutment 207 in the swager head and arrests advance of blank 84. During this cycle of operation, the metal in the spindle area enclosed by the dies which are intermittently radially hammered against the tube end is caused to flow around the mandrel 190 at a controlled rate determined by the speed of axial advance of the continuously rotating blank 84. It will be seen that the position of the mandrel at the time the blank 84 stops determines the amount of metal deposited at desired locations. In the present instance, the metal being deposited in front of the mandrel causes the section 62 (see FIGURE 7) to be formed of maximum wall thickness and minimum internal diameter. This section, in some instances, may become entirely solid. The location of maximum metal deposition is in the area of the die contours 209 which form the rough outline for the inner bearing seat area of the spindle, a region that requires such maximum wall thickness to withstand the high loading stresses. However, to be effective, the amount of metal and the location where it is to be deposited must be closely controlled which in the present instance is accomplished by the controlled rate of infeed of the blank 84 and the stoppage of inward movement of the mandrel 190 at the right predetermined location. As the blank 84 in FIGURE 26 further advances, more metal will be offset in front of the mandrel 190. The tip portion 191 of the mandrel which is of smaller cross-section allows the metal to flow more smoothly so that there will be no abrupt transition from the thick portion 203 into the end section 202 of the spindle.

FIGURE 27 illustrates the last phase of the swaging operation after the inward feed of blank 84 has been stopped, by initiating a final rapid mandrel movement axially inwardly pushing through the front section 202 and through the maximum thickness portion 203 thereby displacing metal radially outwardly into the cavities of the recessed die contour 209 forming the rough shape surrounding the intended bearing seat. As can be seen, the maximum spindle wall thickness is at point 211 slightly behind the shoulder 212 of the intended bearing seat region 213 where the highest stresses are encountered. The final push through of the mandrel is very rapid and at a relatively high thrust load.

In the meantime, simultaneously with forming the spindle section by coaction between the mandrel and swaging die as described, the brake support mounting section 22 is accurately sized in absolute concentricity with the spindle section. This is accomplished by the entrance portions 214 of the swaging dies which shape the accurately round surface 25 immediately adjacent the transition section of the blank 84. The entrance ends of the swaging dies are preferably rounded off as at 215 to cause a smooth shoulder 216 to be formed between the transition section 24 and the spider mounting section 22 to prevent the concentration of stress at this point.

Thus the present invention provides an improved tubular axle with integrally swaged spindle sections in which the amount of upset metal at the bearing seat areas is accurately controlled to provide maximum cross-section areas having a section modulus which closely approaches that of a solid section. The present invention provides further accurately sized and located concentric brake mechanism support mounting areas in conjunction with the swaging of the spindle sections.

After both ends of the blank 84 have been swaged to the form shown in phantom and outer lines in FIGURE 24, the spindle sections are machined as described to form the final spindle as shown in FIGURE 7. This may be done after but preferably before the spiders 12 are welded onto the axle beam.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of making a one-piece hollow vehicle axle beam from a single sheet of metal which comprises forming the sheet to substantially simultaneously provide an intermediate substantially rectangular cross section beam section and opposite substantially cylindrical beam end sections and bending said sheet parallel to its length to bring together the opposite longitudinal side edges at said beam sections, and welding said opposite longitudinal edges together in a region extending through all of said intermediate and end sections.

2. The method defined in claim 1, wherein the sheet is worked during a first forming stage to simultaneously shape the intermediate section thereof to straight beam side wall portions connected by right angle corners and the end sections thereof to cylindrical side wall portions, and the shaped sheet is bent about a longitudinal axis during section stage forming.

3. In a method of making a one-piece hollow axle beam, the steps of forming a single sheet of metal into a tube having a substantially rectangular center section and identical cylindrical end sections, then welding a straight line weld seam connecting opposite longitudinal edges of said sheet, and then swaging said end sections to form reduced diameter increased wall thickness wheel bearing spindles for mounting the inner and outer wheel bearings.

4. In the method of making a hollow axle beam defined in claim 3, said swaging step providing cylindrical brake mounting sections accurately concentric with the spindles and located immediately axially inwardly of the spindles.

5. In the method of making a hollow axle beam defined in claim 3, said swaging step including the steps of thickening each spindle section wall and internally displacing metal from the thickened wall to provide further increased and maximum wall thickness adjacent the inner wheel bearing mounting region.

6. In a method of making an integral hollow axle beam having a rectangular center section and identical cylindrical end sections, the steps of mechanically working a single flat sheet of metal in two successive stages wherein the flat sheet is first deformed to simultaneously form side regions containing the approximate desired shape of the beam sides and said side regions are deflected toward each other until the opposite longitudinal edges of the sheet are adjacent for welding, and then welding said edges together.

7. In a method of forming a hollow axle beam, the steps of die forming a flat sheet of metal of predetermined size to provide deformed longitudinal side regions extending from a central longitudinal non-deformed flat area of the sheet in a first stage, said side regions being simultaneously formed of different cross section in the center and end sections of the beam respectively, and then subjecting the sheet to a further die forming operation wherein the side regions are deflected toward each other until the opposite longitudinal side edges of the sheet are substantially aligned in a second stage, and then welding said edges together to form a permanent hollow beam.

8. A method of making a one-piece hollow axle beam for trailers and like vehicles which comprises the steps of laterally shaping and bending a single sheet of steel of predetermined size and thickness to form a closed contour beam having an intermediate section and identical end sections of different shape in cross section and having the wall thickness of said sheet and welding the opposite longitudinal side edges of the sheet together, and swaging the opposite ends of the beam to form reduced diameter thickened wall cylindrical wheel bearing spindles and inwardly adjacent concentric thickened wall cylindrical brake mechanism support mounting sections.

9. The method defined in claim 8, wherein the annular hubs of brake mechanism mounting supports are welded upon the beam around said brake mechanism support mounting sections.

10. In a method of making a hollow beam for an axle assembly, the steps of forming a sheet of metal to a closed contour comprising substantially cylindrical end sections and an intermediate section of different shape, welding the opposite longitudinal edges of said sheet together, swaging said end sections to form thickened wall wheel mount spindles, forming said end sections at regions axially spaced inwardly of the spindles to provide accurately cylindrical concentric surfaces of larger diameter than said spindles, sliding apertured brake mechanism support members over the beam ends to fit snugly onto said concentric surfaces, and welding said support members onto said beam to form a permanent assembly.

References Cited
UNITED STATES PATENTS

| | | | |
|---|---|---|---|
| 981,697 | 1/1911 | Simpson | 72—366 X |
| 1,010,004 | 11/1911 | Wales | 301—124 |
| 1,288,574 | 12/1918 | Harper | 301—124 |
| 2,124,406 | 7/1938 | Spatta | 301—124 |
| 2,133,091 | 10/1938 | Gettig | 301—124 |
| 2,165,472 | 7/1939 | Friedman | 301—124 |
| 2,256,065 | 9/1941 | Urschel et al. | 72—377 X |
| 2,377,974 | 6/1945 | Sherman | 72—377 X |
| 2,685,479 | 8/1954 | Buckendale | 301—124 |
| 3,037,818 | 6/1962 | Scheel | 301—124 |

JOHN F. CAMPBELL, Primary Examiner

J. L. CLINE, Assistant Examiner

U.S. Cl. X.R.

29—480; 301—124